3,449,565
APPARATUS FOR ABSORPTION ANALYSIS USING A SOURCE HAVING A BROADENED EMISSION LINE
Anthony Rene Barringer, Willowdale, Ontario, Canada, assignor to Barringer Research Limited, Rexdale, Ontario, Canada, a corporation
Filed Oct. 11, 1965, Ser. No. 494,680
Claims priority, application Great Britain, Oct. 16, 1964, 42,416/64
Int. Cl. G01n 23/12
U.S. Cl. 250—43.5          4 Claims

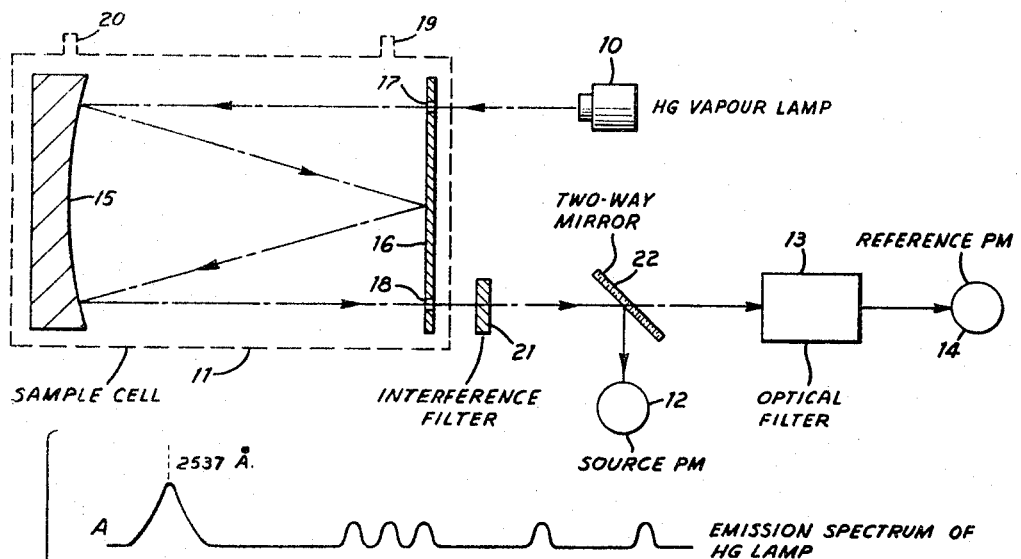
FIG. 1
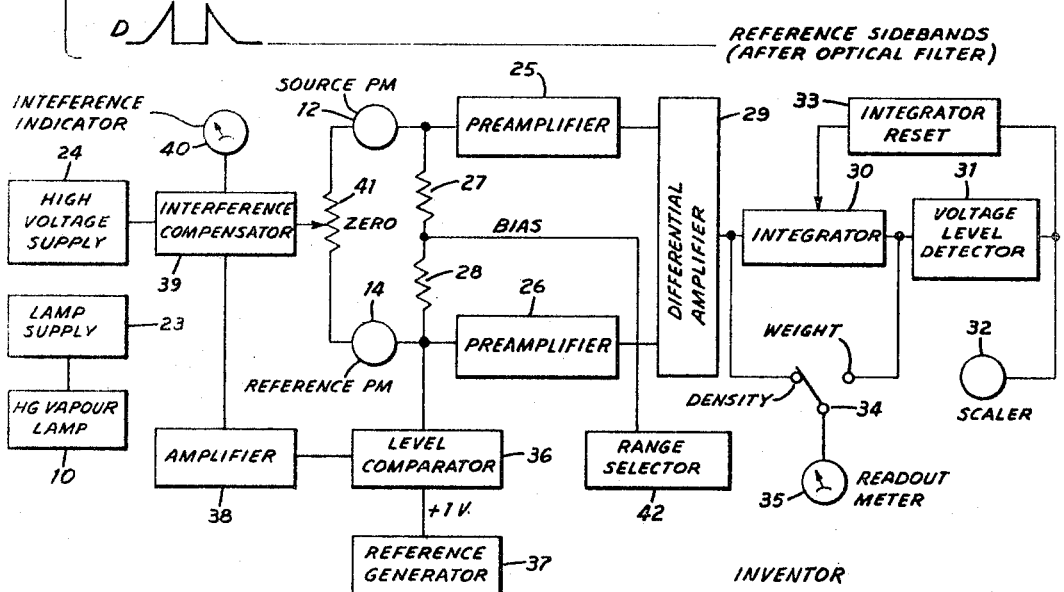
FIG. 2
FIG. 3
INVENTOR
ANTHONY RENE BARRINGER
BY Rogers & Bereskin United States Patent Office 3,449,565
Patented June 10, 1969

ABSTRACT OF THE DISCLOSURE

A spectrophotometer for analyzing vapours having characteristic absorption lines. A particular vapour to be analyzed is illuminated by a lamp having a broadened emission line centered at a characteristic absorption line of the vapour. The width of the emission line is greater than the width of the absorption line. After passing through the vapour, the light is split into two beams. The intensity of one beam (sample beam) is measured, and then the other beam (reference beam) is passed through an absorption cell containing a sufficient quantity of the particular vapour so that light within the linewidth of the absorption line is completely absorbed. The intensity of the remaining portion of the other beam is then measured, and the two measurements are differentially compared.

---

Figure 4:
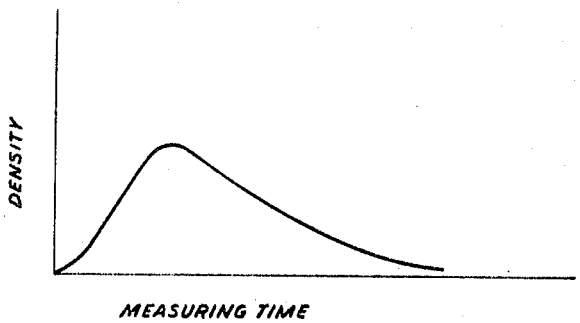

This invention relates to the detection of traces of substances, and in particular to a spectrophotometer that is capable of measuring the density and weight of substances such as mercury vapour in the presence of interfering substances such as benzene.

Spectrophotometric analysis is a method of chemical analysis based on the absorption of electromagnetic energy at specific wavelengths by atoms or molecules of a substance. The interaction between the electromagnetic energy and the substance induces energy level transitions in the substance. A resonance absorption spectrum of a substance is obtained by measuring the absorbance of the substance as a function of wavelength, and points of maximum absorbance in the spectrum represent energy level transitions.

A spectrophotometer essentially consists of a source of radiation, such as a light bulb, a monochromator containing a prism or a grating which disperses the light so that only a limited wavelength range is permitted to irradiate the substance, a sample of the substance, and a detector, such as a photocell which measures the amount of light transmitted by the sample. Spectrophotometers are available for the ultraviolet, visible and infrared portions of the spectrum, and many are capable of precise qualitative and quantitative measurements. A serious problem, however, has been the detection of traces of substances in the presence of interfering substances. For example, the element mercury has a strong absorption line at 2537 A. in the ultraviolet region of the spectrum, but many aromatic compounds such as benzene absorb energy over a relatively broad band in this region and thus tend to mask the mercury line. Interferences are particularly undesirable in density and weight measurements. In one prior spectrophotometer, mercury vapour from an unknown sample is circulated through an absorption chamber, and light at the absorption wavelength is transmitted through the chamber. The intensity of the light is measured after it has passed through the chamber, and then the mercury vapour in the chamber is filtered out of its surrounding atmosphere. The light is then transmitted through the mercury-free surrounding atmosphere, and another light intensity measurement is made. The two intensity measurements are compared differentially to obtain the absorption due to mercury vapour alone. In another prior device, mercury vapour is passed through gold mesh so that the mercury is deposited on the gold, and then the gold is heated to produce mercury vapour in a controlled atmosphere from interfering substances. Conventional spectrophotometric measurements can then be made. Neither of these techniques is entirely satisfactory, since it is not always possible to eliminate the interfering substances, and in addition the measurements are relatively tedious.

Sensitivity is another problem. Metallic vapour lamps that are commonly used as light sources in spectrophotometers usually exhibit some broadening of the emission lines due to pressure broadening and Doppler effects. To improve sensitivity, many prior devices attempt to counteract these broadening effects by using hollow cathode lamps which produce emission lines that are almost as narrow as the absorptiton linewidths.

The present invention utilizes a lamp having an emission line that is deliberately broadened. When the broadened emission line is transmitted through a substance, for example mercury vapour, only the narrow central portion of the emission line (i.e. the portion contained within the absorption linewidth) is absorbed by resonance absorption in the substance, and the two edge portions or sidebands of the emission envelope are not absorbed. The two sidebands are utilized as a reference, and the absorption of the central portion of the emission line is compared with the absorption of the sidebands. Interfering or undesired substances in general absorb the central portion of the emission line and the sidebands equally since the central portion and the sidebands are extremely close in wavelength, but the substance itself absorbs only the central portion of the emission line. This technique provides high sensitivity and in addition is inherently accurate since the reference sidebands and the central portion of the emission line are transmitted simultaneously through the same matter.

The spectrophotometer disclosed herein is capable of measuring the density and weight of minute quantities of mercury in an unknown sample. A mercury vapour lamp is used as a light source, and its 2537 A. emission line is deliberately broadened so that the emission envelope linewidth is broader than the absorption linewidth. The sample is heated, and any resulting mercury vapour is circulated through an absorption chamber through which the light is transmitted. The mercury vapour in the absorption chamber absorbs only the central portion of the emission line and the intensity of the light is measured after it has passed through the absorption chamber. The light is then transmitted through an optical filter consisting of a cell containing dense mercury vapour so that any remaining energy contained within the central portion of the emission line is completely absorbed and only the sidebands remain. The intensity of the light passing through the optical filter is measured and is compared differentially with the intensity of the light passing through the absorption chamber. The ratio of the two measured intensities is a measure of the density of the mercury vapour present in the absorption chamber. The weight of mercury in the unknown sample is obtained by integrating the ratio of the two measured intensities for a time corresponding with the time that the mercury vapour is flowing through the sample cell.

Throughout the following description reference is made to a spectrophotometer that is specifically designed for detecting mercury, but it will be understood that the invention is applicable to other substances capable of spectrophotometric analysis, whether in the ultraviolet, visible or infrared portions of the spectrum, and in general any portion of the electromagnetic spectrum where energy level transitions occur, such as the X-ray and microwave regions of the spectrum.

Objects of the present invention are therefore to provide a spectrophotometer that is sensitive, accurate, and reliable.

Figure 5:
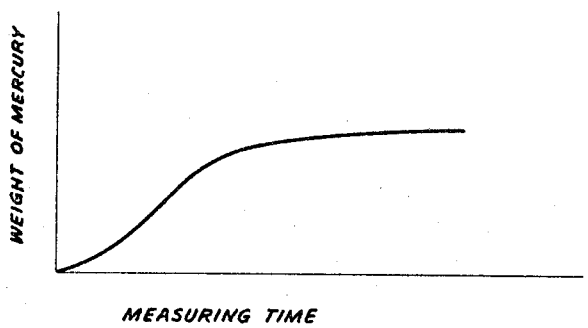
Figure 6:
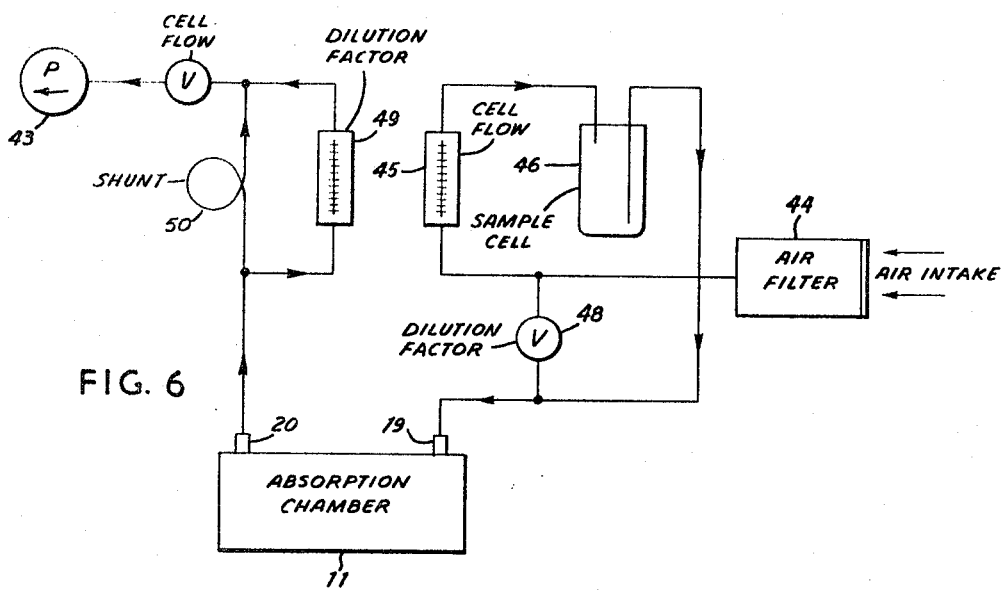

A preferred embodiment of the invention illustrated in the accompanying drawings, wherein:

FIG. 1 is an optical diagram of a mercury vapour spectrophotometer,

FIG. 2 shows the form of an emission envelope at various stages in the device of FIG. 1, FIG. 3 is a block diagram of the electrical circuit of the device of FIG. 1, FIG. 4 shows the variation of the density of mercury vapour from an unknown sample as a function of measuring time, FIG. 5 shows the weight of the mercury vapour in the unknown sample as a function of measuring time, and FIG. 6 is a flow diagram of the mercury vapor and air of the device of FIG. 1.

Referring to the drawings, and in particular to FIG. 1, a spectrophotometer for detecting and measuring traces of mercury in an unknown sample includes a mercury vapour lamp 10 that provides a broadened emission line at 2537 A., an absorption chamber 11 through which mercury vapour from an unknown sample is caused to circulate, a source photomultiplier 12 for measuring the intensity of light passing through the absorption chamber 11, an optical filter 13 for absorbing or suppressing the central portion of the emission line, and a reference photomultiplier 14 for measuring the intensity of light passing through the optical filter 13.

The mercury vapour lamp 10 has an emission spectrum similar to that shown in FIG. 2A. A strong emission line occur at 2537 A. and this line is deliberately broadened so that it is about 0.1 A. wide. The linewidth of the 2537 A. absorption line is about 0.05 A. It is preferred that the energy of the portion of the emission line envelope that is within the absorption linewidth be about equal to the energy of the remainder of the emission line envelope.

The absorption chamber 11 is a cylindrical cell having a spherical mirror 15 at one end and a plane mirror 16 at the opposite end. Light from the lamp 10 enters the absorption chamber 11 through an entrance window or slot 17 in the mirror 16, is reflected back and forth between the two mirrors 15 and 16, and leaves the absorption chamber 11 through an exit window 18. Mercury vapour from an unknown sample enters the sample cell 11 through an inlet 19 and is discharged through an outlet 20.

An intereference filter 21 is provided near the exit window 18 to eliminate all emission lines other than the 2537 A. line, and after passing through the filter 21 the light meets a half silvered two-way mirror 22. Part of the light is directed towards the source photomultiplier 12, and the rest is directed towards the optical filter 13.

The optical filter 13 is a cylindrical cell having quartz windows at each end, and it contains dense mercury vapour. Its function is to absorb or suppress the central portion of the emission line, so that the light passing through the optical filter 13 is contained within the two sidebands only. The intensity of the sidebands is measured by the reference photomultiplier 14. Neutral density filters (not shown) can be provided in the light path to reduce the light intensity sufficiently to avoid swamping the photomultiplier.

FIG. 2B shows the emission envelope of the 2537 A. line after the light has passed through the filter 21, assuming there is no mercury vapour in the absorption chamber 11. FIG. 2C shows the same emission envelope, assuming 50 percent absorption of the central portion of the line by mercury vapour present in the absorption chambor 11. FIG. 2D shows the reference sidebands that are presented to the reference photomultiplier 14 by the optical filter 13.

Since the reference sidebands and the central portion of the emission line are transmitted simultaneously through the same matter in the absorption chamber 11, any interfering substances such as benzene that are present in the absorption chamber 11 have an equal effect on the light measured by the source photomultiplier 12 and the reference photomultiplier 14. The presence of mercury is indicated when the outputs of the two photomultipliers are not the same, provided they are initially balanced. In order to obtain the density and weight of the mercury vapour, however, it is necessary to take into account the absorption by interfering substances, and this is accomplished by the circuit of FIG. 3. The mercury vapour lamp 10 is energized by a lamp supply 23 which provides 1,000 cycle per second square waves at a voltage of 900 volts and a current of 15 milliamperes,. The lamp 10 is carefully stabilized so that it operates at a temperature of 100 degrees centigrade. It is important that the energy content of the 2537 A. emission line is kept constant, and for this reason the lamp temperature is carefully controlled. A suitable lamp is manufactured by Penray Ultraviolet Products of San Gabriel, California, and is identified as model 11SC1. Under the above conditions, this lamp produces an emission line at 2537 A. having a linewidth of about 0.1 A. A high voltage supply 24 provides power for both photo multipliers 12 and 14. Photomultipliers identified as type 1P28 by Radio Corporation of America are suitable. The gain of both photomultipliers varies with the voltage applied to them, and as will be explained more fully below when interfering substances are present the gain is automatically increased to compensate for the presence of the interfering substances. Normally the high voltage supply 24 delivers between about 500 to 600 volts D.C., depending upon the required sensitivity, but this may be increased if interfering substances are present.

The outputs of the preamplifiers 25 and 26 are fed to a differential amplifier 29. The outputs of the photomultiplier tubes are made equal when no mercury vapour is present in the absorption chamber 11, and then the output of the differential amplifier is zero. When absorption occurs in mercury vapour, however, the output of the source photomultiplier 12 is reduced, and the output of the differential amplifier is proportional in amplitude to the density of mercury vapour in the absorption chamber provided that the output of the reference photomultiplier remains constant.

In order to facilitate understanding of the remainder of the circuit, reference is now made to FIG. 4. In a typical determination a small sample containing an unknown quantity of mercury is heated in order to vapourize the mercury, and the density of mercury vapour leaving the sample as a function of time is represented by a curve similar to that of FIG. 4. The total area under the curve represents the total weight of mercury present in the sample. Thus, the weight of the mercury can be obtained by integrating the output of the differential amplifier 29, and this is accomplished by an integrator 30. The weight of mercury as a function measuring time is represented by the curve of FIG. 5, which is the integral of the curve of FIG. 4. A voltage level detector 31 measures the output of the integrator 30 and causes a scaler 32 to advance one count after the output of the integrator 30 reaches a predetermined level. At the same time, the voltage level detector 31 triggers an integrator reset 33 so that the integrator 30 is automatically reset as soon as its output voltage reaches a predetermined level. A switch 34 selects either the input or output of the integrator 30 and the selected signal is displayed by a readout meter 35. Thus, the readout meter 46 indicates either the instantaneous density of the mercury vapour or else the accumulated weight of mercury during each integration cycle. The integrator 30 is preferably reset at a point near the maximum scale reading of the meter 35. Assuming that the scale of the meter 35 reads from 0 to 1, a typical reading consists of the reading of the scaler 32 (e.g. 1, 2, 3, etc.) plus the reading of the meter 35 (e.g., .7).

If interfering substances such as benzene or dust are present in the absorption chamber 11, the central portion and the sidebands of the emission envelope are attenuated equally, but for density and weight measurements it is desirable that the signal used as a reference be kept at a constant level. This is so because if one of the signals fed to the differential amplifier 29 is kept constant, the output of the differential amplifier is then proportional to the ratio of the two input signals, and not merely to their difference. It is the ratio of the two input signals that is required for density and weight measurements. Thus, if interfering substances are present, it is necessary to compensate for them for otherwise the output of the reference photomultiplier 14 would not in general be constant. Automatic compensation is provided as follows.

A level comparator 36 compares the voltage at the input of the preamplifier 26 with the level of a constant reference voltage (e.g. 1 volt positive) produced by a reference generator 37. When no interfering substances are present, there is little or no voltage differential across the level comparator 36. When interfering substances are present, however, the output levels of both photomultipliers are correspondingly reduced because the light intensity is reduced, and this causes a voltage differential across the level comparator 36. The output of the level comparator 36, amplified by an amplifier 38, is proportional to the density of interfering substances present in the absorption chamber 11. An interference compensator 39 is adapted to vary the high voltage supplied to the photomultipliers in accordance with the level of the voltage supplied by the amplifier 38. Since the gain of a photomultiplier depends upon the amplitude of the voltage supplied to it, the above arrangement automatically compensates for the presence of interfering substances by varying the gain of the photomultipliers sufficiently to exactly compensate for the presence of interfering substances. A meter 40 connected to the interference compensator 39 constitutes an interference indicator since it indicates the variation of the high voltage supplied to the photomultipliers. A potentiometer 41 permits the gains of the two photomultipliers to be balanced.

Various ranges of sensitivity are provided by a range selector 42 which produces a bias voltage that is applied to the junction of the resistors 27 and 28. In the present device, maximum sensitivity is achieved when the bias is 80 volts positive. The maximum output of the photomultipliers is about 80 volts negative. If the bias is reduced to 40 volts, for example, there is a momentary differential across the level comparator 36 of about 40 volts, and this causes a reduction in the gain of the photomultipliers. Steady conditions are again achieved when the gain is sufficiently reduced that the output level of the photomultipliers matches the new bias voltage. It has been found convenient to use bias voltages of 10, 20, 40 and 80 volts, and in the equations below, these bias voltages represent sensitivities of 1, 2, 4 and 8 units, respectively.

A preferred form of flow system is illustrated schematically in FIG. 6. A sample containing an unknown quantity of mercury is placed in a sample cell 46, such as Pyrex vial. When the sample cell 46 is heated, mercury vapour is released. Air is drawn through the system by a suction pump 43. Incoming air is filtered by an air filter 44 to remove any mercury vapour from the air, and then the air passes through a flow meter 45 referred to as "cell flow" in FIG. 6. The sample cell 46 is connected in series with the flow meter 45 and the inlet 19 of the absorption chamber 11. The flow rate is controlled by a valve 47, and is typically adjusted for a reading of 4 liters per minute on the flow meter 45. If the density of the mercury vapour leaving the sample cell 46 is sufficiently large that there is a likelihood that 100% absorption will occur in the absorption chamber 11, it is desirable to dilute the mercury vapour in the absorption chamber 11 with a known amount of pure air. This is accomplished as follows. A valve 48, referred to as "dilution factor" in FIG. 6, is connected between the flow meter 45 and the inlet 12 of the absorption chamber, so that a portion of the air from the air filter 44 can be diverted into the absorption chamber without mixing with the mercury vapour leaving the sample cell 46. A flow meter 49, referred to as "dilution factor" in FIG. 6, is connected between the valve 47 and the outlet 20 of the absorption chamber 11. A shunt 50, consisting of a short (e.g. 5″) length of plastic tubing, with an internal diameter of about ⅛″, is connected across the flow meter 49. With the valve 48 closed, the shunt 50 is cut to a length so that the air flowing through the flow meter 49 provides a scale reading of 1 unit. The dilution factor is given by the equation:

$$\text{Dilution factor} = \frac{\text{sample cell flow} + \text{bypass flow}}{\text{sample cell flow}}$$

The bypass flow is the quantity of air flow through the valve 48. Thus, when the valve 48 is closed, so that there is zero bypass flow, the dilution factor is 1, and as the valve 48 is opened the flow meter 49 indicates the dilution factor for the particular setting of the valve 48.

Instead of providing a suction pump 43, pressurized air could be fed into the air filter 44, for example from a cylinder of compressed air. If this arrangement is used the valve 47 should be placed ahead of the air filter 44.

The spectrophotometer can be calibrated by observing the reading on the scaler 32 and the readout meter 35 after a known weight of mercury has passed through the absorption chamber 11. A calibration constant for the spectrophotometer is given by the equations $$C = \frac{W}{N}$$

and $$N = N_1 \frac{D}{S}$$

where:

C is the calibration constant,
W is the weight of mercury,
$N_1$ is the reading on the scaler and readout meter,
D is the dilution factor, and
S is the sensitivity (e.g. 1, 2, 4 or 8)

The operation of the spectrophotometer is as follows. First, the electrical circuits and the suction pump 43 are energized. The valves 47 and 48 are opened to respectively provide the desired cell flow (e.g. 4 liters/minute) and dilution factor. The range selector 42 is then adjusted to provide a bias level corresponding to the desired sensitivity. The sample is heated so that mercury vapour is driven off and is circulated through the absorption cell. With the switch 34 in the position where the readout meter 35 indicates the density of the mercury vapour, the reading given by the readout meter 35 will build to a maximum and then fall to zero, in accordance with the curve shown in FIG. 4. Switch 35 is then switched to its opposite position and the reading of the scaler 32 and the readout meter 35 is observed. The weight of mercury in the sample can be obtained from the equations given above.

As indicated above, the invention is not limited to the ultraviolet portion of the spectrum. In general, it is considered that principles of the invention can be applied to other portions of the spectrum where energy level transitions occur as a result of the interaction of electromagnetic energy with matter. It will also be understood that, for energy other than light, components (e.g. energy detectors) should be used that are analogous in function to those mentioned above. The invention could also be used with liquid samples and possibly solid samples in appropriate regions of the spectrum. Finally, it may be possible to use the sun as a source in order to investigate the distribution of elements in the earth's and moon's atmospheres.

What I claim as my invention is:

1. A spectrophotometer for analyzing vapours having absorption lines centered at characteristic wavelengths with characteristic linewidths, comprising:

a lamp that is adapted to produce a beam of light having a broadend emission line centered at a characteristic wavelength of an absorption line of a particular vapour, the emission line having a linewidth such that the energy of the portion of the emission line that is within the linewidth of said absorption line is about equal to the energy of the remainder of the emission line, a chamber containing a sample of vapour to be analyzed, the chamber having transparent windows and being positioned in the path of said light beam, a first filter for filtering the light to substantially remove all components of the light except said emission line, a first photosensitive detector for producing a first voltage that is proportional in amplitude to the intensity of said emission line after the light has passed through the chamber and said first filter, a second filter comprising a cell having transparent windows and being positioned so that the light beam passes through it after passing through said chamber and said first filter, said second filter being filled with a sufficient quantity of said particular vapour so that light contained within said linewidth of said absorption line is completely absorbed, a second photosensitive detector for producing a second voltage that is proportional in amplitude to the intensity of the light within said emission line after it has passed through said sample and said first and second filters, and means for differentially comparing the amplitudes of the first and second voltages.

2. A spectrophotometer as claimed in claim 1 wherein the first and second photosensitive detectors are photomultipliers, and wherein the comparing means includes a differential amplifier that is adapted to amplify the difference between the amplitudes of the first and second voltages, means for integrating the output of the differential amplifier, and display means for monitoring the output of the integrating means.

3. A spectrophotometer as claimed in claim 1 wherein means is provided for compensating for the attenuation of light due to the presence of interfering substances in the chamber, the compensating means including a reference generator for producing a fixed reference voltage, a level comparator adapted to produce a signal that is proportional to the difference in level between the second voltage and the reference voltage, the second voltage being substantially equal to the reference voltage with no interfering substances present in the chamber, and means responsive to the level comparator signal for varying the gain of the first and second photosensitive detectors so that the second voltage is kept substantially equal to the reference voltage without changing the ratio of the first and second voltages.

4. A spectrophotometer as claimed in claim 3 wherein the particular vapour is mercury vapour that is pumped through the chamber at a controlled rate of flow, wherein the characteristic wavelength is 2537 A., and wherein the linewidth of the emission line is about 0.1 A.

References Cited

UNITED STATES PATENTS

| | | | |
|---|---|---|---|
| 2,974,227 | 3/1961 | Fisher et al. | 250—43.5 |
| 3,183,515 | 5/1965 | Hartman et al. | 250—43.5 X |
| 3,281,596 | 10/1966 | Williston | 250—43.5 |
| 3,327,117 | 6/1967 | Kamentsky | 250—43.5 X |

WILLIAM F. LINDQUIST, *Primary Examiner.*

U.S. Cl. X.R.

88—14